US012265341B2

(12) United States Patent
Tang et al.

(10) Patent No.: US 12,265,341 B2
(45) Date of Patent: Apr. 1, 2025

(54) DEVELOPING CARTRIDGE WITH A BENT BLADE HOLDER OF A DOCTOR BLADE ELEMENT

(71) Applicant: ZHUHAI YUANCHENG DIGITAL TECHNOLOGY CO., LTD., Zhuhai (CN)

(72) Inventors: Liangchun Tang, Zhuhai (CN); Jinbo Lv, Zhuhai (CN); Hongfang Liu, Zhuhai (CN)

(73) Assignee: ZHUHAI YUANCHENG DIGITAL TECHNOLOGY CO., LTD., Zhuhai (CN)

( * ) Notice: Subject to any disclaimer, the term of this patent is extended or adjusted under 35 U.S.C. 154(b) by 5 days.

(21) Appl. No.: 18/275,415

(22) PCT Filed: Dec. 7, 2021

(86) PCT No.: PCT/CN2021/136203
§ 371 (c)(1),
(2) Date: Aug. 2, 2023

(87) PCT Pub. No.: WO2022/166372
PCT Pub. Date: Aug. 11, 2022

(65) Prior Publication Data

US 2024/0036494 A1 Feb. 1, 2024

(30) Foreign Application Priority Data

Feb. 3, 2021 (CN) ......................... 202120310346.7
Feb. 3, 2021 (CN) ......................... 202120310347.1
Apr. 9, 2021 (CN) ......................... 202120727785.8

(51) Int. Cl.
*G03G 15/08* (2006.01)
*G03G 15/00* (2006.01)
*G03G 21/18* (2006.01)

(52) U.S. Cl.
CPC ....... *G03G 15/0812* (2013.01); *G03G 15/757* (2013.01); *G03G 21/1814* (2013.01);
(Continued)

(58) Field of Classification Search
CPC ............... G03G 15/0812; G03G 21/18; G03G 21/1814; G03G 21/1857; G03G 21/186;
(Continued)

(56) References Cited

U.S. PATENT DOCUMENTS 5,778,286 A * 7/1998 Kido .................. G03G 5/14773 399/265
6,381,430 B1 4/2002 Yokomori et al.
(Continued)

FOREIGN PATENT DOCUMENTS

CN 1508638 A 6/2004
CN 102109798 A 6/2011
(Continued)

*Primary Examiner* — Arlene Heredia
*Assistant Examiner* — Laura Roth
(74) *Attorney, Agent, or Firm* — Bayramoglu Law Offices LLC

(57) ABSTRACT

A developing cartridge includes a housing for accommodating a toner, a developing roller rotatably mounted in the housing, a doctor blade in contact with the developing roller, and a driving device located at a longitudinal end of the housing. The driving device includes a driving force receiving part for receiving a driving force from the outside of the developing cartridge, and is configured to drive the developing roller to rotate. The doctor blade is in contact with a surface of the developing roller to adjust a thickness of a toner layer on the surface of the developing roller. When viewed along a longitudinal direction of the developing cartridge, at least the driving force receiving part does not overlap with the doctor blade.

19 Claims, 11 Drawing Sheets

(52) U.S. Cl.
CPC ....... *G03G 21/1857* (2013.01); *G03G 21/186* (2013.01); *G03G 2215/0866* (2013.01); *G03G 2215/0872* (2013.01)

(58) Field of Classification Search
CPC ......... G03G 2215/0805; G03G 15/757; G03G 2215/0866; G03G 2215/0872
See application file for complete search history.

(56) References Cited

U.S. PATENT DOCUMENTS

| | | | | |
|---|---|---|---|---|
| 2002/0003974 | A1* | 1/2002 | Nittani | G03G 15/0812 399/284 |
| 2005/0031359 | A1* | 2/2005 | Ishii | G03G 15/0889 399/12 |
| 2007/0122176 | A1* | 5/2007 | Sato | G03G 15/065 399/90 |
| 2009/0190952 | A1* | 7/2009 | Xu | G03G 15/0817 399/103 |
| 2012/0148297 | A1* | 6/2012 | Peng | G03G 15/553 399/119 |
| 2014/0205314 | A1* | 7/2014 | Chang | G03G 21/1633 399/119 |
| 2017/0269542 | A1* | 9/2017 | Itabashi | G03G 21/1867 |
| 2021/0382434 | A1* | 12/2021 | Morioka | G03G 15/757 |
| 2023/0061656 | A1* | 3/2023 | Zhou | G03G 15/55 |
| 2024/0231255 | A1* | 7/2024 | Liu | G03G 15/0896 |

FOREIGN PATENT DOCUMENTS

| | | | | | |
|---|---|---|---|---|---|
| CN | 107203118 | A | | 9/2017 | |
| CN | 108021005 | A | | 5/2018 | |
| CN | 109459922 | A | * | 3/2019 | G03G 15/0896 |
| CN | 113075870 | A | * | 7/2021 | G03G 15/0812 |
| CN | 214504130 | U | | 10/2021 | |

* cited by examiner

DEVELOPING CARTRIDGE WITH A BENT BLADE HOLDER OF A DOCTOR BLADE ELEMENT

CROSS REFERENCE TO THE RELATED APPLICATIONS

This application is the national phase entry of International Application No. PCT/CN2021/136203, filed on Dec. 7, 2021, which is based upon and claims priority to Chinese Patent Applications No. 202120310347.1, filed on Feb. 3, 2021; No. 202120310346.7, filed on Feb. 3, 2021; No. 202120727785.8, filed on Apr. 9, 2021; and the entire contents of which are incorporated herein by reference.

TECHNICAL FIELD

The present disclosure relates to the field of electrophotographic imaging, and in particular to a developing cartridge detachably mounted in an electrophotographic imaging device.

BACKGROUND

A laser printer is a commonly used electrophotographic imaging device, while a developing cartridge is a consumable detachably mounted in the laser printer. When the laser printer is operating, the toner held in the developing cartridge is consumed. The existing developing cartridge is provided with a counting device in order to promptly send notifications of replacing the developing cartridge to the user. The laser printer is provided with a counted part matched with the counting device. When the developing cartridge is mounted into the laser printer, the counting device interacts with the counted part, such that the laser printer can recognize information of the developing cartridge, such as the model and lifespan.

The developing cartridge further includes a driving force receiving part for receiving a driving force from the laser printer, a developing roller for conveying the toner to the outside, and a doctor blade for adjusting a thickness of a toner layer on a surface of the developing roller. The doctor blade is in contact with an outer surface of the developing roller. The driving force receiving part is provided at one end of the developing cartridge along a length direction. The doctor blade and the developing roller are arranged along the length direction. At a moment when the driving force receiving part receives the driving force from the laser printer, the driving force causes the driving force receiving part to vibrate. When the vibration is transmitted to the developing roller and the doctor blade, the contact state between the developing roller and the doctor blade may change, thereby affecting the imaging quality of the developing cartridge.

SUMMARY

The present disclosure provides a developing cartridge. The developing cartridge includes a housing for accommodating a toner, a developing roller rotatably mounted in the housing, a doctor blade in contact with the developing roller, and a driving device located at a longitudinal end of the housing, where the driving device includes a driving force receiving part for receiving a driving force from the outside of the developing cartridge, and is configured to drive the developing roller to rotate; the doctor blade is in contact with a surface of the developing roller to adjust a thickness of a toner layer on the surface of the developing roller; when viewed along a longitudinal direction of the developing cartridge, at least the driving force receiving part does not overlap with the doctor blade; and at a moment when the driving force is received by the driving force receiving part, a vibration transmitted to the doctor blade and the developing roller is reduced, such that a possible change in a contact state between the doctor blade and the developing roller is suppressed.

At this point, a diameter of the developing roller is correspondingly reduced to 12 mm-19 mm, preferably 16 mm, thereby reducing a material cost of the developing roller. Alternatively, when viewed along a rotation axis of the driving force receiving part, a distance between a rotation center point of the developing roller and a center point of the driving force receiving part is increased to 17 mm-19 mm. Correspondingly, a contact position between the developing roller and the doctor blade is further away from the driving force receiving part, such that an impact of the vibration generated by the driving force receiving part on the contact state between the developing roller and the doctor blade is reduced.

The developing cartridge further includes a counting device driven by the driving force receiving part; the counting device includes a driven member for receiving the driving force and a pushing member for interacting with the counted part; and the driven member and the pushing member are eccentrically arranged. In this way, the accuracy requirement for the contact between the driven member and the pushing member is reduced. In addition, the pushing member is separated from the driven member, and the counting device is adapted to various models of laser printers by changing the position or structure of the pushing member.

Furthermore, the counting device further includes a moving member combined with the driven member; when counting is finished, the moving member drives the driven member to separate from the driving member that is configured to drive the driven member; and a part of the moving member is exposed through an end cover of the developing cartridge. In this way, an end user can reset the counting device by pressing the moving member, without removing the end cover, which improves the use experience.

DETAILED DESCRIPTION OF THE EMBODIMENTS

The embodiments of the present disclosure are described below according to the drawings. It should be understood that any modifications made by those skilled in the art to the embodiments of the present disclosure based on the following content should be deemed as falling within the protection scope of the present disclosure.

Figure 1:
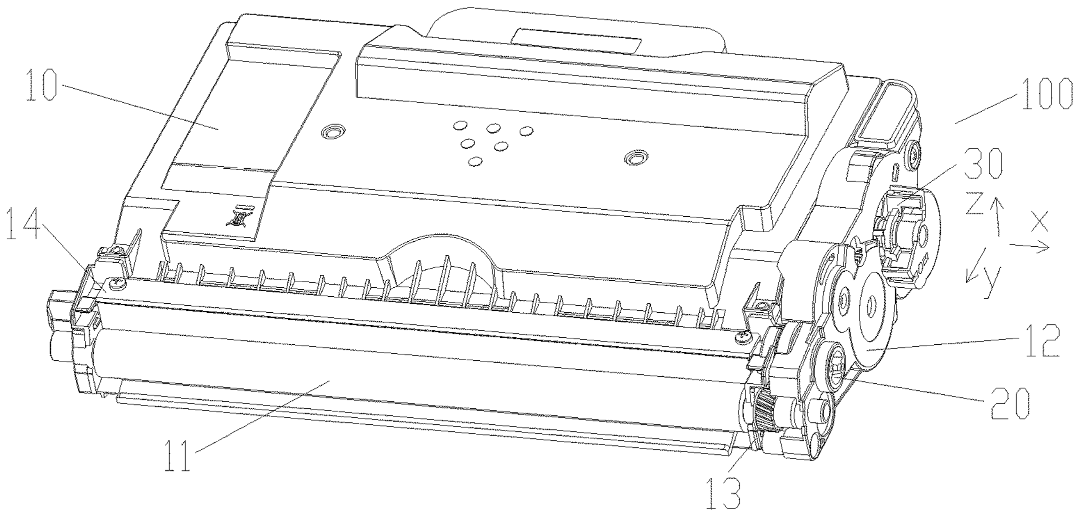
FIG. 1 is a stereoscopic view of a developing cartridge according to the present disclosure.

FIG. 1 is a stereoscopic view of a developing cartridge according to the present disclosure. Developing cartridge 100 can be combined with a drum frame not shown in the figure to form a process cartridge. The drum frame includes a drum frame body and a photosensitive drum rotatably mounted in the drum frame body. The developing cartridge 100 or process cartridge is detachably mounted in a laser printer provided with a counted part. The developing cartridge 100 is mounted along a y-direction, and has a length extending in an x-direction and a height extending in a z-direction. The z-direction is a direction from a bottom of the developing cartridge 100 to a top of the developing cartridge when the developing cartridge 100 is placed normally. It is herein defined that a direction parallel to the x-direction is a longitudinal direction, a direction parallel to the y-direction is a transverse direction, and a direction parallel to the z-direction is a vertical direction.

The developing cartridge 100 includes housing 10 for accommodating a toner, developing roller 11 rotatably mounted in the housing 10, doctor blade 14 and supply roller 15 (shown in FIG. 11) that are in contact with the developing roller 11, driving device 20 and counting device that are located at a longitudinal end of the housing, and end cover 12 provided on a same side as the counting device 30. The supply roller 15 conveys the toner to the developing roller 11, and supplies the toner outwards from the developing roller 11. The doctor blade 14 is abutted against an outer surface of the developing roller 11 to adjust a thickness of a toner layer on the outer surface of the developing roller 11. The counting device 30 can be provided on the same side as the driving device 20. Alternatively, the counting device 30 and the driving device 20 can be located at two longitudinal ends of the housing 10, respectively. Regardless of how the counting device and the driving device are distributed, a driving force required for the operation of the counting device 30 is supplied by the driving device 20. That is, after the driving device 20 receives the driving force from an external part such as one in the laser printer, the developing roller 11, the supply roller 15, and the counting device 30 are driven to operate.

Embodiment 1

Figure 2:
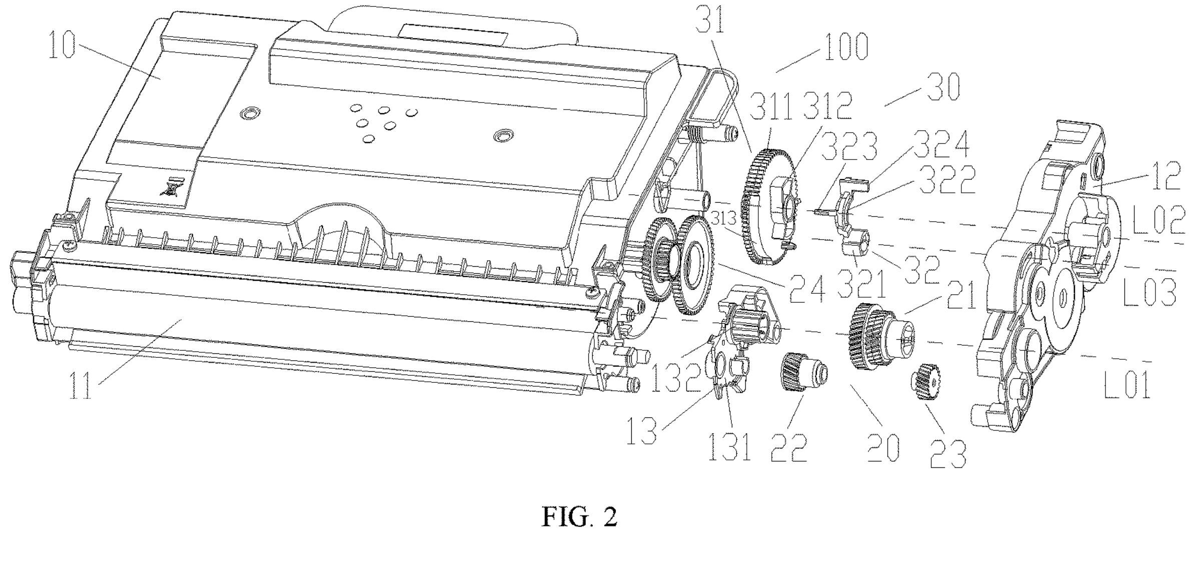
FIG. 2 is an exploded view of some parts in the developing cartridge according to Embodiment 1 of the present disclosure.
Figure 3:
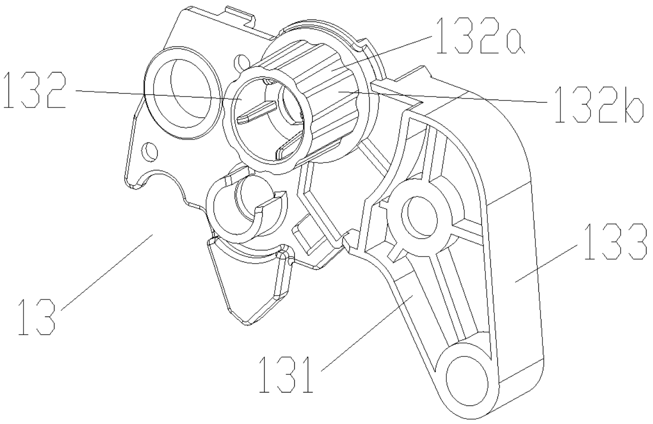
FIG. 3 is a stereoscopic view of a support frame of the developing cartridge according to Embodiment 1 of the present disclosure.
Figure 4:
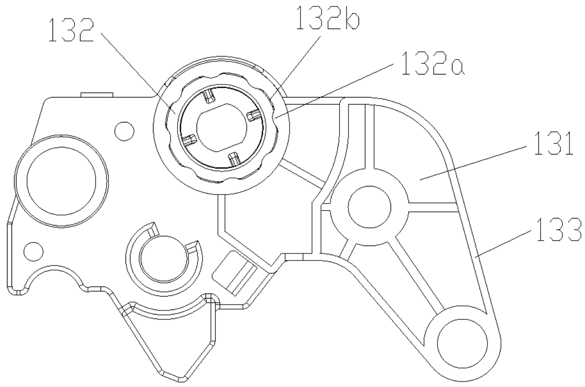
FIG. 4 is a side view of the support frame of the developing cartridge according to Embodiment 1 of the present disclosure.
Figure 5:
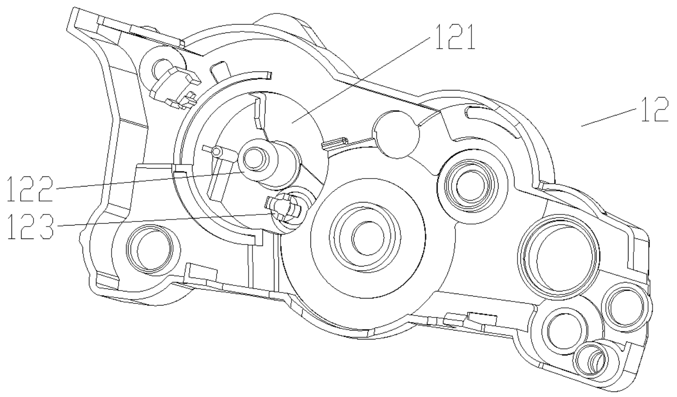
FIG. 5 is a stereoscopic view of an end cover of the developing cartridge according to Embodiment 1 of the present disclosure.

FIG. 2 is an exploded view of some parts in the developing cartridge according to Embodiment 1 of the present disclosure; FIG. 3 is a stereoscopic view of a support frame of the developing cartridge according to Embodiment 1 of the present disclosure; FIG. 4 is a side view of the support frame of the developing cartridge according to Embodiment 1 of the present disclosure; and FIG. 5 is a stereoscopic view of an end cover of the developing cartridge according to Embodiment 1 of the present disclosure.

The driving device 20 includes driving force input member 21, developing roller gear 22, supply roller gear 23, and intermediate gear 24. The developing roller gear 22 and the supply roller gear 23 are located at ends of the developing roller 11 and the supply roller 15, respectively. The driving force input member 21 is simultaneously meshed with the developing roller gear 22, the supply roller gear 23, and the intermediate gear 24. Therefore, when the driving force input member 21 receives the driving force, the driving force input member 21 rotates around rotation axis L01, and the developing roller gear 22, the supply roller gear 23, and the intermediate gear 24 begin to rotate. Correspondingly, the developing roller 11 and the supply roller are respectively driven by the developing roller gear 22 and the supply roller gear 23. The counting device 30 is driven by the intermediate gear 24.

The support frame 13 is configured to support the driving force input member 21, the developing roller 11, and the supply roller. Specifically, main body 131 of the support frame 13 is provided with support post 132 and multiple through-holes. The driving force input member 21 is supported by the support post 132. A shaft of the developing roller 11 and a shaft of the supply roller both pass through the through-holes, allowing the developing roller 11 and the supply roller to be supported. The developing roller gear 22 and the supply roller gear 23 are respectively mounted on the shaft of the developing roller and the shaft of the supply roller. However, the support post 132 and the through-holes configured to support the shaft of the developing roller and the shaft of the supply roller can also be provided separately. That is, the support frame 13 is broken up into multiple parts for supporting the shaft of the developing roller, the shaft of the supply roller, and the driving force input member 21.

As shown in FIG. 3, the support frame 13 is further provided with pushed part 133 for receiving a pushing force. The pushed part 133 is integrated with the main body 131. Therefore, a strength of the pushed part 133 is guaranteed. After the developing cartridge 100 is mounted, the pushed part 133 is configured to receive the pushing force, causing the developing roller 11 to maintain contact with the photosensitive drum outside the developing cartridge. At this point, the pushed part 133 does not extend outward from the housing 10. In terms of volume, the support frame 13 is much smaller than the housing 10. During transportation, the smaller support frame 13 is more easily protected than the housing 10. Even with bumps, the pushed part 133 is less likely to break when located on the support frame 13 than when located on the housing 10.

The support frame 13 is located between the housing 10 and the end cover 12. When the support frame 13 is mounted, overall, the support frame 13 can be seen as extending outward from the housing 10. Therefore, the pushed part 133 can receive the pushing force, without the need to protrude on the support frame 13, further ensuring the overall strength of the support frame 13. Meanwhile, the pushed part 133 formed as an integral part with the main body 131 is not easily broken.

The driving force input member 21 is rotatably supported by the support post 132. Generally, the support post 132 is a cylindrical body protruding from the main body 131. An outer surface of the support post 132 includes multiple recessed parts 132*a* and multiple protruding parts 132*b*. The recessed parts are adjacent to the protruding parts. As shown in FIG. 4, when viewed along a direction of the rotation axis L01, outermost edges of the multiple protruding parts 132*b* are located on a same circumferential surface. When the driving force input member 21 is mounted, a contact area between the support post 132 and the driving force input member 21 decreases, thereby reducing a friction force between the support post and the driving force receiving part.

As shown in FIG. 2, the counting device 30 includes driving gear 31 and pushing member 32. The driving gear 31 is meshed with the intermediate gear 24. Driven by the intermediate gear 24, the driving gear 31 rotates around rotation axis L02. The pushing member 32 rotates around rotation axis L03 which is different from the rotation axis L02. That is, the driving gear 31 and the pushing member 32 are eccentrically arranged. In combination with FIGS. 2 and 5, it can be seen that the driving gear 31 is mounted on the housing 10, and the pushing member 32 is mounted on the end cover 12. The overall structure of the counting device 30 is simplified.

The driving gear 31 includes gear body 311 and pushing protrusion 312 provided on the gear body 311. The gear body 311 is configured to receive the driving force of the intermediate gear 24. The pushing protrusion 312 is provided in an arc shape to force the pushing member 32 to rotate, causing the pushing member 32 to push the counted part in the laser printer. According to the model, color, and other attributes of the developing cartridge 100, the arc angle, number, and other factors of the pushing protrusion 312 may be different. The following is an example of a combination and separation process of the pushing protrusion 312 and the pushing member 32. Along the rotation direction of the driving gear 31, the pushing protrusion 312 is provided with front end part 312*a*, rear end part 312*b*, and intermediate part 312*c* located between the front end part and the rear end part.

A circumferential surface of the gear body 311 is provided with a tooth part and a tooth-missing part. The pushing protrusion 312 is arranged concentric with the gear body 311 and extends along a circumferential direction of the gear body 311. When the tooth part of the gear body 311 is opposite to the intermediate gear 24, the driving gear 31 can be driven to rotate by the intermediate gear 24. When the tooth-missing part is opposite to the intermediate gear 24, the driving gear 31 cannot be driven by the intermediate gear 24. At this point, the driving gear 31 stops rotating. Correspondingly, the pushing member 32 also stops operating.

The pushing member 32 includes rotating part 321, rod part 322 extending from the rotating part 321, and pushing part 324 and force bearing part 323 that are provided on the rod part 322. The rotating part 321 is eccentric relative to the driving gear 31. The force bearing part 323 is pushed by the pushing protrusion 312. The pushing part 324 pushes the counted part.

As shown in FIG. 5, the end cover 12 is provided with hole 121, a positioning part 122 located in a center of the hole 121, and clamping part 123 eccentric relative to the positioning part 122. The pushing member 32 is fixed to the clamping part 123 and exposed from the hole 121. The positioning part 122 is used for positioning the driving gear 31.

Figure 6A:
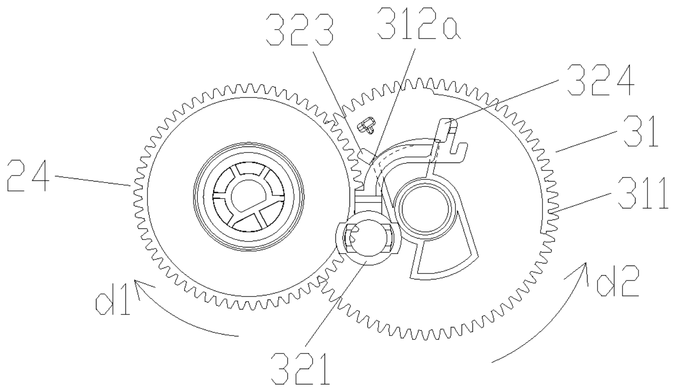
FIGS. 6A and 6B are schematic diagrams of a positional relationship between various parts of a driving gear and a counting device when the counting device begins a counting process according to Embodiment 1 of the present disclosure.
Figure 6B:
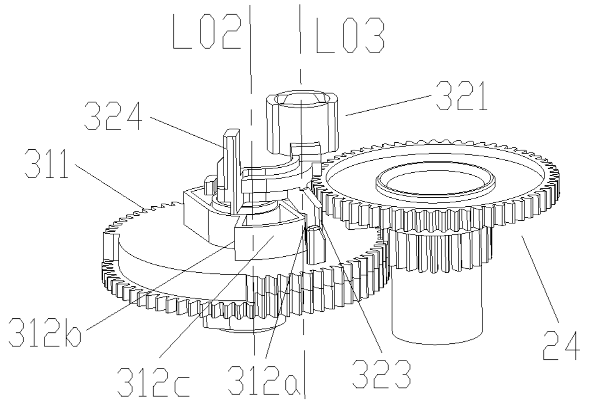
Figure 7A:
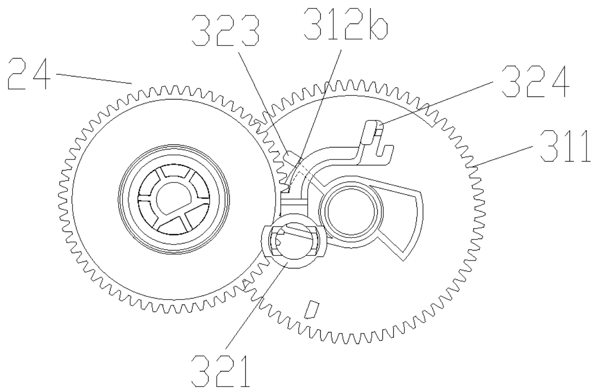
FIGS. 7A and 7B are schematic diagrams of a positional relationship between the various parts of the driving gear and the counting device when the counting device implements the counting process according to Embodiment 1 of the present disclosure.
Figure 7B:
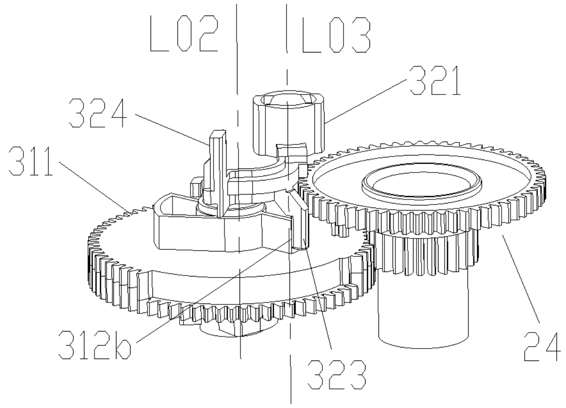
Figure 8A:
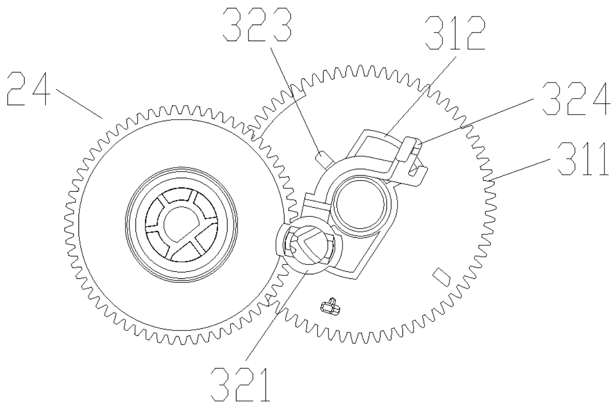
FIGS. 8A and 8B are schematic diagrams of a positional relationship between the various parts of the driving gear and the counting device after the counting device finishes the counting process according to Embodiment 1 of the present disclosure.
Figure 8B:
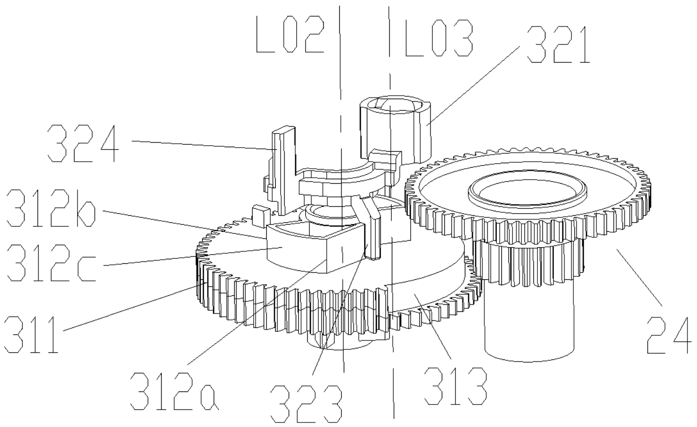

FIGS. 6A and 6B are schematic diagrams of a positional relationship between various parts of the driving gear and the counting device when the counting device begins a counting process according to Embodiment 1 of the present disclosure; FIGS. 7A and 7B are schematic diagrams of a positional relationship between the various parts of the driving gear and the counting device when the counting device implements the counting process according to Embodiment 1 of the present disclosure; and FIGS. 8A and 8B are schematic diagrams of a positional relationship between the various parts of the driving gear and the counting device after the counting device finishes the counting process according to Embodiment 1 of the present disclosure.

When the counting device 30 is in an initial state of a counting process, the tooth part of the gear body 311 is meshed with the intermediate gear 24, and the force bearing part 323 is located at a position adjacent to the front end part 312*a*. As the intermediate gear 24 rotates in a d1-direction, the driving gear 31 begins to rotate in a d2-direction. The pushing protrusion 312 rotates with the gear body 311, causing the force bearing part 323 to be held in the intermediate part 312*c*. At this point, the pushing member 32 remains stationary, and the pushing part 324 can continuously come into contact with the counted part. When the pushing protrusion 312 rotates with the gear body 311 until the rear end part 312*b* contacts with the force bearing part 323, the pushing protrusion 312 is about to separate from the force bearing part 323, but at this point, the pushing member 32 remains stationary. As the gear body 31 continues to rotate, the pushing protrusion 312 detaches from the pushing member 32. Under an elastic force of an elastic member combined with the pushing member 32, the pushing member 32 rotates in a direction opposite to the d2-direction, causing the pushing part 324 to separate from the counted part. Meanwhile, the tooth-missing part of the gear body 311 is opposite to the intermediate gear 24. Although the intermediate gear 24 continues to rotate, the gear body 311 no longer receives the driving force. The driving gear 31 and the pushing member 32 remain stationary. The counting device 30 finishes the counting process.

When multiple pushing protrusions 312 are provided, parameters in the initial state, such as a meshing position of the gear body 311 and the intermediate gear 24 and a length of the tooth-missing part, are adjusted, the purpose of the adjustment is to ensure that each pushing protrusion 312 can be combined with and separated from the pushing member 32 during the counting process of the counting device 30, and when the counting device 30 finishes the counting process, the tooth-missing part of the gear body 311 is opposite to the intermediate gear 24. In the counting process, when the force bearing part 323 is separated from the pushing protrusion 312, under the elastic force of the elastic member, the pushing member 32 rotates in the direction opposite to the d2-direction to combine with a next pushing protrusion 312 until the tooth-missing part of the gear body 311 is opposite to the intermediate gear 24.

The driving gear 31 of the counting device 30 is eccentrically arranged relative to the pushing member 32. The driving gear 31 can keep the pushing member 32 stationary during the rotation process, and in the duration, the number of times and other parameters for keeping the pushing member 32 stationary can be set according to a counting demand of the counting device 30. The combination of an arc surface provided on the driving gear 31 and the force bearing part 323 provided on the pushing member 32 can reduce an accuracy requirement for the contact between the driving gear 31 and the pushing member 32. Meanwhile, the driving gear 31 and the pushing member 32 are respectively mounted on the housing 10 and the end cover 12. Therefore, the structure of the counting device 30 is simplified, thereby reducing the assembly difficulty of the counting device.

Figure 9:
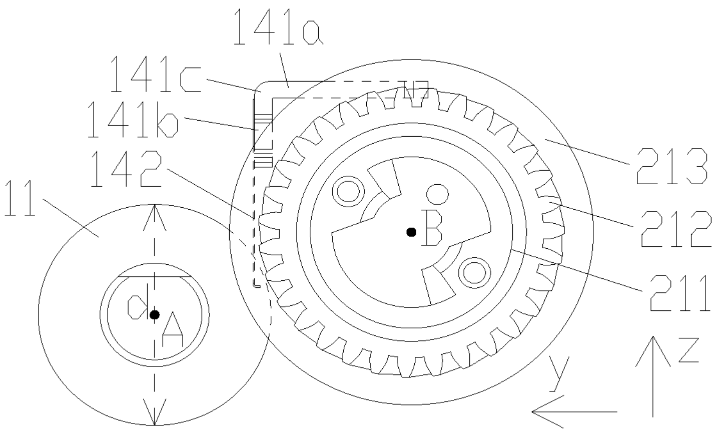
FIG. 9 is a schematic diagram of relative positions of a developing roller, a doctor blade, and a driving force receiving gear of the developing cartridge viewed in a direction parallel to a longitudinal direction according to Embodiment 1 of the present disclosure.

FIG. 9 is a schematic diagram of relative positions of the developing roller, the doctor blade, and the driving force receiving gear of the developing cartridge viewed in a direction parallel to the longitudinal direction according to Embodiment 1 of the present disclosure.

As shown in FIG. 3, the doctor blade 14 includes blade holder 141 and blade 142 that are combined. The blade holder 141 is fixedly mounted on the housing 10, and the blade is abutted against an outer surface of the developing roller 11. The driving device 20 includes driving force input member 21, the developing roller gear 22, the supply roller gear 23, and at least one intermediate gear 24. The driving force input member 21 includes driving force receiving part 211, and first driving gear 212 and second driving gear 213 that are combined with the driving force receiving part 211. Diameters of the driving force receiving part 211, the first driving gear 212, and the second driving gear 213 increase sequentially. The driving force receiving part 211 receives the driving force from the outside. The first driving gear 212 is meshed with the supply roller gear 23, and the second driving gear 213 is meshed with the developing roller gear 22. After the driving force input member 21 receives the driving force, the developing roller gear 22, the supply roller gear 23, and the at least one intermediate gear 24 are all driven. Thus, the developing roller 11 and the supply roller 15 begin to rotate.

As mentioned above, when the developing cartridge 100 is operating, the driving force receiving part 211 needs to receive the driving force from the laser printer and drive the supply roller gear 23 and the developing roller gear 22 to rotate through the first driving gear 212 and the second driving gear 213, respectively. The blade holder 141 of the doctor blade includes relatively bent first part 141*a* and second part 141*b*. Preferably, bent part 141*c* with a 90° corner is formed between the first part 141*a* and the second part 141*b*. The blade 142 is fixed on the second part 141*b*. When the doctor blade 14 is fixed on the housing 10, the first part 141*a* and the second part 141*b* are mutually limited, ensuring that the doctor blade 14 is stably mounted on the housing 10.

The driving force input member 21 is combined with the housing 10 through the support frame 13. In processes when the driving force receiving part 211 receives the driving force from the outside, when the driving force is transmitted between the first driving gear 212 and the supply roller gear 23, and when the driving force is transmitted between the second driving gear 213 and the developing roller gear 22, a vibration is generated between the two combined parts. Especially, at a moment when the driving force receiving part 211 receives the driving force, the entire driving force input part 21 generates a significant vibration. When the vibration is transmitted to the doctor blade 14 and the developing roller 11 through the housing 10, it is likely to cause a change in the abutment state between the doctor blade 14 and the developing roller 11.

To reduce the impact of the vibration transmitted on the relative positions of the doctor blade 14 and the developing roller 11, as shown in FIG. 9, when viewed along the x-direction of the developing cartridge, at least the driving force receiving part 211 does not overlap with the doctor blade 14. At a moment when the driving force receiving part 211 receives the driving force, the vibration transmitted to the doctor blade 14 and the developing roller 11 is reduced. Alternatively, at least the driving force receiving part 211 does not overlap with at least one of the bent part 141*c* and the blade 142. In this way, even if the vibration is transmitted to the doctor blade 14, the vibration can only affect the first part 141*a* of the blade holder, and will not affect the second part 141*b* of the blade holder and the blade 142 mounted on the second part 141*b* of the blade holder.

As shown in FIG. 9, along the mounting direction y of the developing cartridge 100, a contact position between the doctor blade 14 and the developing roller 11 is located in front of the driving force receiving part 211. Alternatively, both the developing roller 11 and the blade 142 are located in front of the driving force receiving part 211. Alternatively, both the developing roller 11 and the blade 142 are located outside a circumferential range of the driving force receiving part 211. In the vertical direction z, the first part 141*a* of the blade holder is located above the driving force receiving part 211. The design reduces the impact of the vibration on the relative positions of the doctor blade 14 and the developing roller 11. Meanwhile, with a dimension of the developing cartridge 100 determined along the mounting direction, the design reduces an outer diameter of the developing roller 11 and reduces a material cost of the developing roller 11. In the present disclosure, the outer diameter d of the developing roller 11 is 12 mm-19 mm, preferably 16 mm. When viewed along the rotation axis of the driving force receiving part 211, the distance between center point A of the developing roller 11 and center point B of the driving force input member 21 (driving force receiving part 211) is increased to 17 mm-19 mm.

Furthermore, when viewed in the longitudinal direction of the developing cartridge 100, the first driving gear 212 does not overlap with at least one of the bent part 141*c*, the second part 141*b* of the blade holder, and the blade 142. Therefore, the impact of the vibration generated when the driving force is transmitted between the first driving gear 212 and the supply roller gear 23 on the blade 142 is reduced.

Embodiment 2

Figure 10:
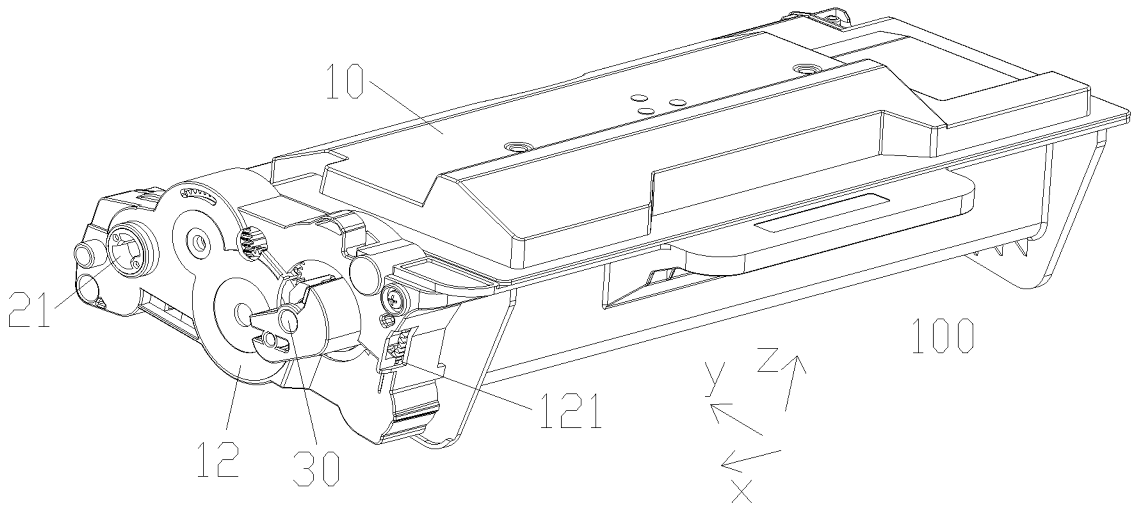
FIG. 10 is a stereoscopic view of a developing cartridge according to Embodiment 2 of the present disclosure.
Figure 11:
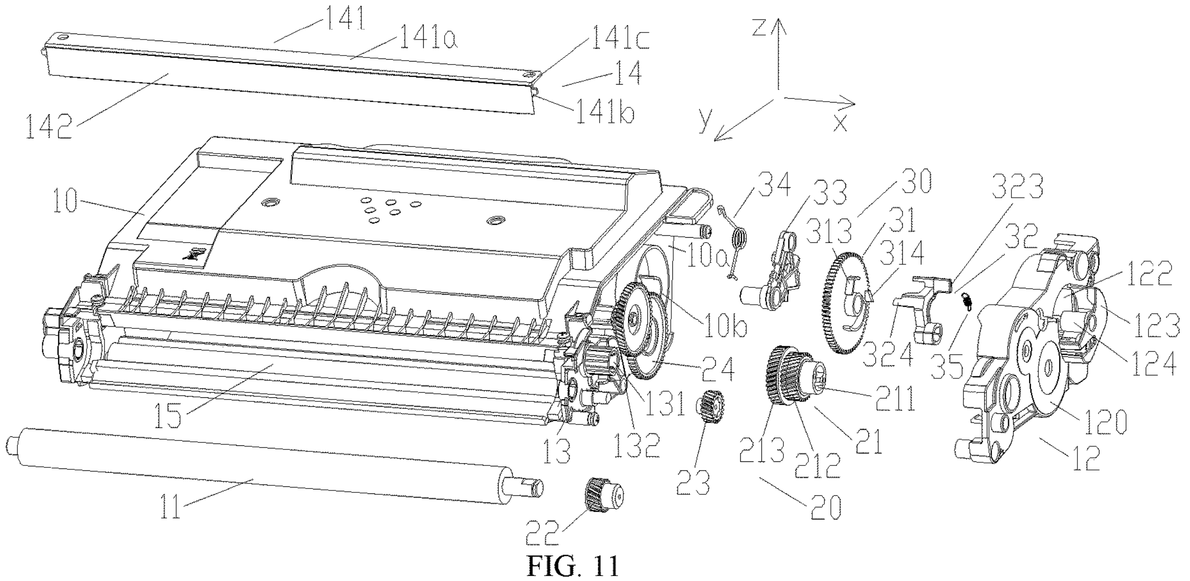
FIG. 11 is an exploded view of some parts of the developing cartridge according to Embodiment 2 of the present disclosure.

FIG. 10 is a stereoscopic view of the developing cartridge according to Embodiment 2 of the present disclosure; and FIG. 11 is an exploded view of some parts of the developing cartridge according to Embodiment 2 of the present disclosure. For ease of understanding, the same parts in this embodiment and the above embodiment use the same numbering.

As shown in FIG. 10, a part of driving device 20 and/or a part of counting device 30 are covered by end cover 12. Driving force input member 21 configured to receive driving force in the driving device 20 is exposed from the end cover 12, and at least a part of the counting device 30 is exposed from the end cover 12. Specifically, along the y-direction, a part configured to receive a reset force in the counting device 30 is exposed from a rear end of the end cover 12, making it easier for an operator to reset the counting device 30. Alternatively, in a mounting process or disassembly process of the developing cartridge 100, the drum frame or a part in the laser printer forces the counting device 30 to reset.

In this embodiment, the counting device 30 includes counting gear 31, pushing member 32, moving member 33, and first reset member 34. The counting gear 31 is meshed with the driving gear 24. When the driving gear 24 begins to rotate, the counting gear 31 is driven. Feasibly, a driving force of the counting gear 31 can also be generated by friction between a rubber layer provided on an outer surface of the driving gear 24 and the counting gear 31. Alternatively, both the driving gear 24 and the counting gear 31 are replaced with rubber wheels. Therefore, the driving gear 24 can be regarded as one of driving members configured to drive the counting gear 31 to rotate, and the counting gear 31 can be regarded as one of driven members. The pushing member 32 and the counting gear 31 are separated and are provided eccentrically. As the counting gear 31 rotates, the pushing member 32 is pushed by the counting gear 31 at intervals. When the pushing member 32 is pushed, the pushing member 32 interacts with a counted part in a laser printer to complete the recognition of the developing cartridge 100 by the laser printer. A part of the moving member 33 is coaxial with the counting gear 31. Under a pushing force of the first reset member 34, the moving member 33 tends to move away from the driving member 24. Alternatively, the moving member 33 tends to separate from the driving member 24. After the counting process is finished, the counting gear 31 is driven by the moving member 33 to separate from the driving member 24. When the counting device 30 needs to be reset, a force is exerted on the moving member 33 to overcome the first reset member 34. The counting gear 31 is driven by the moving member 33 to return to a position where counting gear 31 is combined with the driving member 24. In other words, in the present disclosure, the counting gear 31 can move between the position where the counting gear 31 is combined with the driving member 24 and a position where the counting gear 31 is separated from the driving member 24 under the drive of the moving member 33.

The first reset member 34 generates the pushing force through an elastic or magnetic part, etc. Preferably, the first reset member 34 is a torsion spring. The torsion spring includes one end abutted against the housing 10 and the other end abutted against the moving member 33. As shown in FIG. 11, to ensure that the pushing member 32 can stably receive a pushing force from the counting gear 31, the counting device 30 further includes second reset member 35 combined with the pushing member 32. The second reset member 35 is configured to force the pushing member 32 back to a position where the pushing member can receive the pushing force applied by the counting gear 31. Similarly, the second reset member 35 can also be an elastic or magnetic part. Preferably, the second reset member 35 is a tension spring. The tension spring includes one end combined with the pushing member 32 and the other end combined with the end cover 12.

Figure 12:
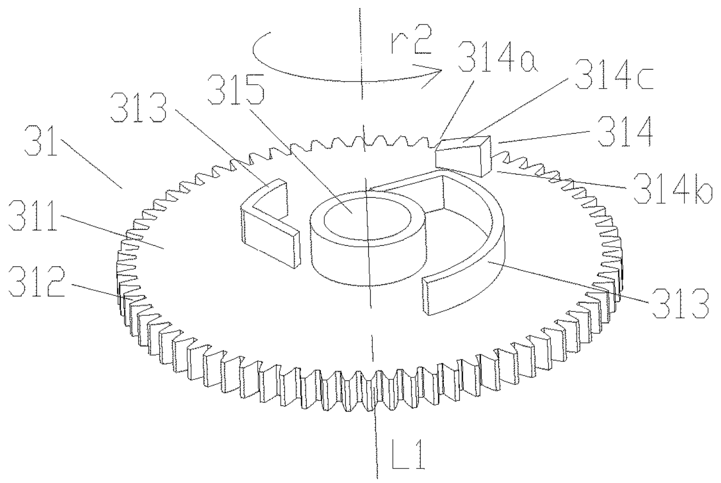
FIG. 12 is a stereoscopic view of a counting gear in the developing cartridge according to Embodiment 2 of the present disclosure.
Figure 13A:
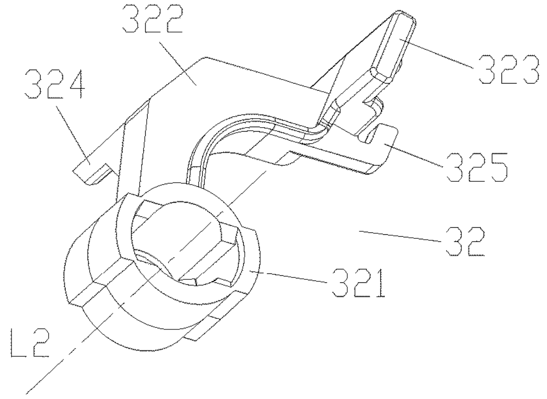
FIGS. 13A and 13B are stereoscopic views of a pushing member of a counting device in the developing cartridge according to Embodiment 2 of the present disclosure.
Figure 13B:
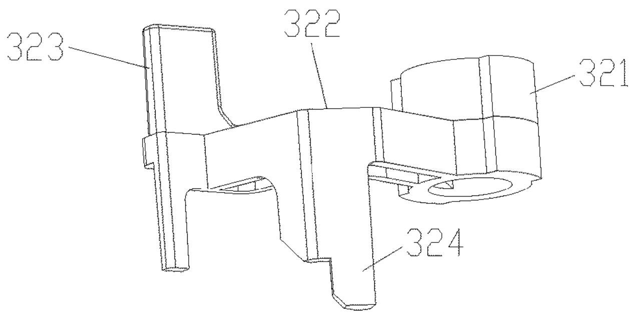
Figure 14:
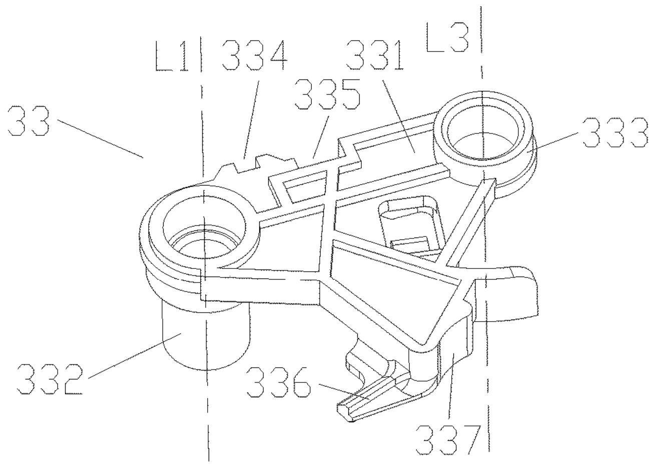
FIG. 14 is a stereoscopic view of the moving member of the counting device in the developing cartridge according to Embodiment 2 of the present disclosure.
Figure 15A:
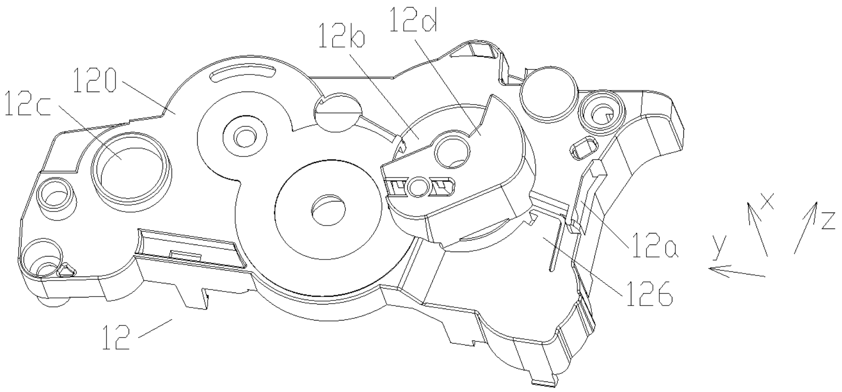
FIG. 15A is a stereoscopic view of an end cover of the developing cartridge viewed from an outside according to Embodiment 2 of the present disclosure.
Figure 15B:
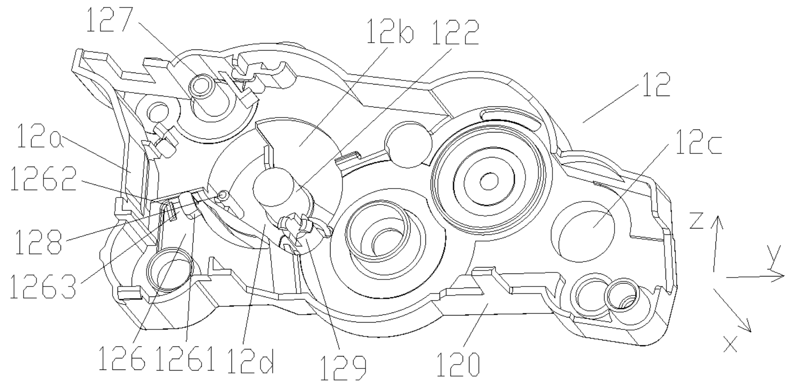
FIG. 15B is a stereoscopic view of the end cover of the developing cartridge viewed from an inside according to Embodiment 2 of the present disclosure.

FIG. 12 is a stereoscopic view of the counting gear in the developing cartridge according to Embodiment 2 of the present disclosure; FIGS. 13A and 13B are stereoscopic views of the pushing member of the counting device in the developing cartridge according to Embodiment 2 of the present disclosure; FIG. 14 is a stereoscopic view of the moving member of the counting device in the developing cartridge according to Embodiment 2 of the present disclosure; FIG. 15A is a stereoscopic view of the end cover of the developing cartridge viewed from the outside according to Embodiment 2 of the present disclosure; and FIG. 15B is a stereoscopic view of the end cover of the developing cartridge viewed from the inside according to Embodiment 2 of the present disclosure.

The counting gear 31 is rotatable around rotation axis L1, and includes teeth 312 provided on an outer circumference, at least one pushing protrusion 313 provided on surface 311, and unlocking member 314 rotatable with the counting gear. The teeth 312 are combined with the driving member 24 to receive the driving force. The pushing protrusion 313 is provided along a circumferential direction of the counting gear 31. The number and shape of the pushing protrusion 313 are determined based on an amount of information of the developing cartridge that the laser printer needs to recognize. For example, the laser printer can determine the lifespan information of the developing cartridge based on the number of the pushing protrusion 313. Alternatively, the laser printer can also determine the model of the developing cartridge and other information based on a length of the pushing protrusion 313 in the circumferential direction of the counting gear 31. When multiple pushing protrusions 313 are provided, the multiple pushing protrusions 313 are arranged at intervals. The unlocking member 314 is configured to unlock the moving member 33, which will be described in detail below.

As shown in FIG. 12, the counting gear 31 further includes combination part 315 provided therein. The combination part 315 is configured to combine with a part of the moving member 33, such that after the counting device 30 finishes a counting process, the counting gear 31 can move with the movement of the moving member 33. Specifically, the combination part 315 is a shaft hole coaxial with the rotation axis L1 and protruding from the surface 311.

Correspondingly, the moving member 33 is provided with protruding post 332 that fits with the shaft hole (as shown in FIG. 14). Alternatively, the protruding post 332 is provided on the counting gear 31, and the shaft hole is provided on the moving member 33. In a modified implementation, the shaft hole 315 or protruding post 332 may not need to be coaxial with the rotation axis L1, but rather parallel or relatively inclined with the rotation axis L1 on the counting gear 31, as long as the counting gear 31 can move with the movement of the moving member 33.

The pushing member 32 and the counting gear 31 are arranged eccentrically. When the counting gear 31 rotates, the pushing protrusion 313 pushes the pushing member 32 to rotate, causing the pushing member 32 to interact with the counted part. Compared to an existing structure where the pushing member 32 and the counting gear 31 are arranged concentrically, the pushing member 32 and the counting gear 31 in the present disclosure are separated and relatively eccentric. Therefore, a developing cartridge manufacturer can change the relative position of the pushing member 32 and the counting gear 31 based on the position of the counted part in the laser printer, without the need to redesign the counting gear 31. This can reduce the production costs of the developing cartridge manufacturer.

The pushing member 32 includes base part 321 rotatable around rotation axis L2, intermediate part 322 protruding outward from the base part 321, pushing element 323 provided on the intermediate part 322, and force bearing part 324. The force bearing part 324 is abutted against the pushing protrusion 313 on the counting gear 31. When the counting gear 31 rotates, the pushing protrusion 313 forces the force bearing part 324, causing the pushing member 32 to rotate around the rotation axis L2. Meanwhile, the pushing element 323 interacts with the counted part. Along the rotation axis L2, the pushing element 323 and the force bearing part 324 are respectively located on two sides of the intermediate part 322. During the rotation of the pushing member 32, the interaction between the pushing element 323 and the counted part, as well as the interaction between the force bearing part 324 and the pushing protrusion 313, is not affected, thereby reducing the complexity of the developing cartridge.

The moving member 33 includes main body 331, and rotating part 333 and combined part (protruding post) 332 that are provided on the main body 331. Under the pushing of the first reset member 34 or when a pushing force of the first reset member 34 is overcome, the moving member 33 can rotate around rotation axis L3 through the rotating part 333. As mentioned above, preferably, the protruding post 332 is coaxial with the counting gear 31. That is, the rotation axis L1 passes through the protruding post 332. At this point, the rotation axis L1 and the rotation axis L3 are parallel to each other, and the moving member 33 moves in a plane perpendicular to the rotation axis L1. As shown in FIG. 14, the moving member 33 further includes positioning part 334, locked part 336, and pushed part 337 that are provided on the main body 331. Preferably, the positioning part 334, the locked part 336, and the pushed part 337 are all integrated with the main body 331. One end of the first reset member 34 is received by the positioning part 334. The locked part 336 is configured to combine with an external locking member, preventing the moving member 33 from rotating around the rotation axis L3 under the pushing of the first reset member 34, such that the protruding post 332 and the combination part 315 of the counting gear 31 remains relatively stationary. At this point, the counting gear 31 remains combined with the driving member 24. When the counting device 30 needs to be reset, the pushed part 337 receives a force from the outside to overcome the pushing force exerted by the first reset member 34 on the moving member 33. In this way, the moving member 33 rotates around the rotation axis L3, and drives the counting gear 31 back to the position where the counting gear 31 is combined with the driving member 24 through the protruding post 332.

Feasibly, the locked part 336 and the pushed part 337 are separated from the main body 331. At this point, between the locked part 336 and the main body 331, as well as between the pushed part 337 and the main body 331, are connected through a connecting member. When the locked part 336 is locked with the external locking member, the main body 331 is also locked. When an external force is applied to the pushed part 337, the main body 331 can also rotate around the rotation axis L3.

The end cover 12 includes end cover body 120, and first through-hole 12*a*, second through-hole 12*b*, and third through-hole 12*c* that are provided on the end cover body 120. The first through-hole 12*a* generally opens in the y-direction and faces a rear end of the developing cartridge in the mounting direction. The specific shape of the end cover is not limited. The first through-hole 12*a* can be circular, polygonal, or in other shape. The second through-hole 12*b* and the third through-hole 12*c* extend in the x-direction. The counting device 30 is exposed through the second through-hole 12*b*, and the driving force receiving part 211 is exposed through the third through-hole 12*c*. As shown in FIGS. 15A and 15B, the end cover 12 further includes cover 12*d* provided opposite to the second through-hole 12*b*, and multiple positioning parts 122/127/128/129 protruding from the cover 12*d* or the end cover body 120 towards the housing. The counting gear 31 is opposite to the positioning post 122, but the positioning part 127 does not limit the movement of the counting gear 31. The moving member 33 is supported and positioned by the positioning post 127. The pushing member 32 is supported and positioned by the positioning post 129. One end of the second reset member 35 is connected to the positioning post 128.

Furthermore, the end cover 12 further includes locking member 126 adjacent to the second through-hole 12*b*. That is, in the present disclosure, the locking member 126 is provided on the end cover 12. Of course, the locking member 126 can also be provided on the housing 10. The following is an example where the locking member 126 is provided on the end cover 12.

Preferably, the locking member 126 is formed as a part of the end cover body 120, and the locking member 126 can be deformed relative to the end cover body 120. As shown in FIG. 15B, the locking member 126 is provided with unlocking protrusion 1261 and limit element 1262 on one side facing the housing 10. Locking part 1263 is formed between the locking protrusion 1261 and the limit element 1262. The locking part 1263 is formed as a locking groove. When the locked part 336 enters the locking groove 1263, the moving member 33 is locked and cannot be forced to move by the first reset member 34.

Figure 16A:
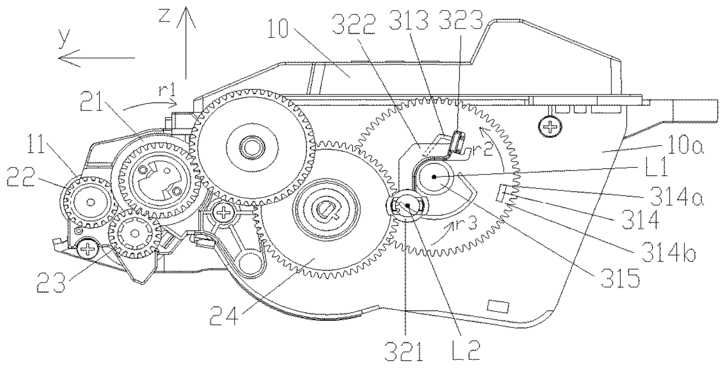
FIG. 16A is a side view of the developing cartridge viewed from a side of the developing cartridge when the counting device in the developing cartridge begins a counting process according to Embodiment 2 of the present disclosure.
Figure 16B:
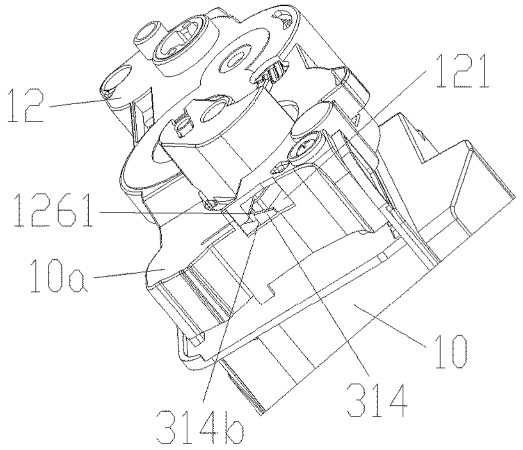
FIG. 16B is a schematic diagram of relative positions of a counting gear and the end cover when the counting device in the developing cartridge begins the counting process according to Embodiment 2 of the present disclosure.
Figure 16C:
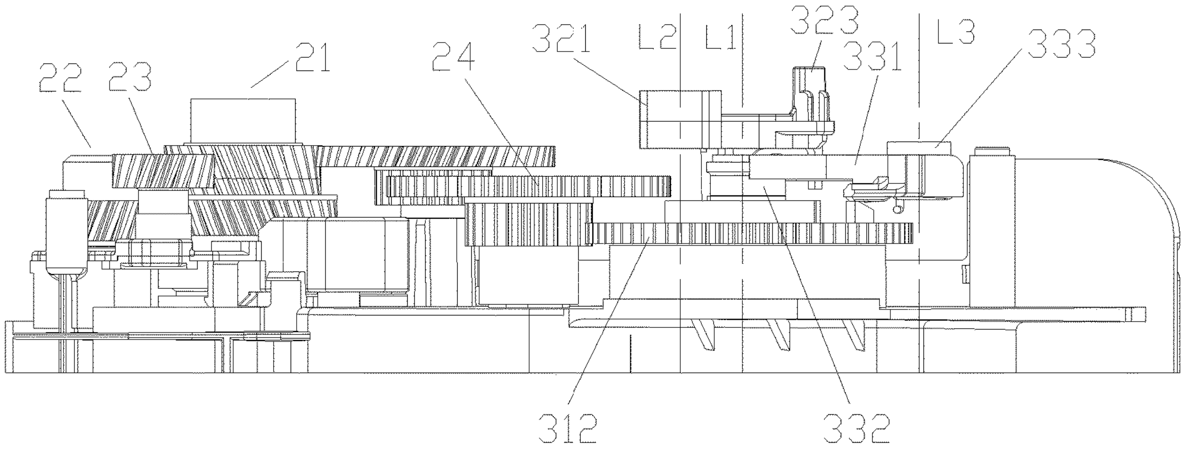
FIG. 16C is a side view of the developing cartridge viewed in a vertical direction when the counting device in the developing cartridge begins the counting process according to Embodiment 2 of the present disclosure.

FIG. 16A is a side view of the developing cartridge viewed from a side of the developing cartridge when the counting device in the developing cartridge begins a counting process according to Embodiment 2 of the present disclosure; FIG. 16B is a schematic diagram of relative positions of the counting gear and the end cover when the counting device in the developing cartridge begins the counting process according to Embodiment 2 of the present disclosure; and FIG. 16C is a side view of the developing cartridge viewed in the vertical direction when the counting device in the developing cartridge begins the counting process according to Embodiment 2 of the present disclosure.

As shown in FIG. 11, the developing cartridge 100 further includes limit plate 10*b* provided on longitudinal end surface 10*a* of the housing 10. The limit plate 10*b* is configured to limit a movement range of the counting gear 31 after the counting process is finished. As shown in FIG. 12, the unlocking member 314 protrudes from the surface 311 of the counting gear. Along the rotation direction r2 of the counting gear 31, the unlocking member 314 has front end 314*a* and rear end 314*b*. The rear end 314*b* protrudes further from the surface 311 than the front end 314*a*. Therefore, inclined surface 314*c* is formed between the front end 314*a* and the rear end 314*b*.

To better display the state of each part of the counting device 30, the end cover 12 is hidden in FIG. 16A. As shown in the figure, when the developing cartridge 100 is mounted in the laser printer with the drum frame, the counting gear 31 can be in a combined state or non-combined (separated) state with the driving member 24. When the counting gear 31 and the driving member 24 are in the non-combined (separated) state, the pushed part 337 can receive a force applied by an operator or the drum frame or a part of the laser printer (such as a door cover or an inner wall of the laser printer). In this way, the moving member 33 drives the counting gear 31 to move, causing the counting gear 31 to reach the position where the counting gear 31 is combined with the driving member 24. At this point, as shown in FIG. 16B, the rear end 314*b* of the unlocking member 314 is abutted against the unlocking protrusion 1261. A possible reverse rotation of the counting gear 31 is prevented, and the locked part 336 enters the locking groove 1263. Even if the first reset member 34 applies a pushing force to the moving member 33, the moving member 33 will not move. Correspondingly, the counting gear 31 will not move either.

The driving force input member 21 begins to rotate in an r1-direction (shown in FIG. 16A) after receiving the driving force. The driving force is transmitted to the counting gear 31 through the driving member 24. The counting gear 31 begins to rotate around the rotation axis L1 in an r2-direction. When the pushing protrusion 313 moves the force bearing part 324, the pushing member 32 begins to rotate around the rotation axis L2 in an r3-direction. When one pushing protrusion 313 pushes the force bearing part 324, the second reset member 35 undergoes deformation. The pushing element 323 interacts with the counted part in the laser printer until the pushing protrusion 313 is separated from the force bearing part 324. Under a reset force of the second reset member 35, the pushing member 32 rotates around the rotation axis L2 in a direction opposite to the r3-direction, causing the force bearing part 324 to mesh with the next pushing protrusion 313. The above process is repeated.

Figure 17A:
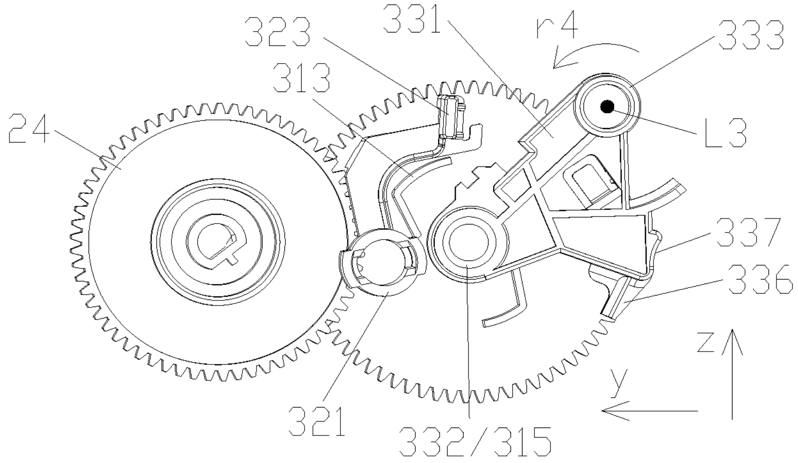
FIG. 17A is a schematic diagram of the relative positions of the counting gear, the driving member, and the moving member of the counting device in the developing cartridge when the counting device finishes the counting process according to Embodiment 2 of the present disclosure.
Figure 17B:
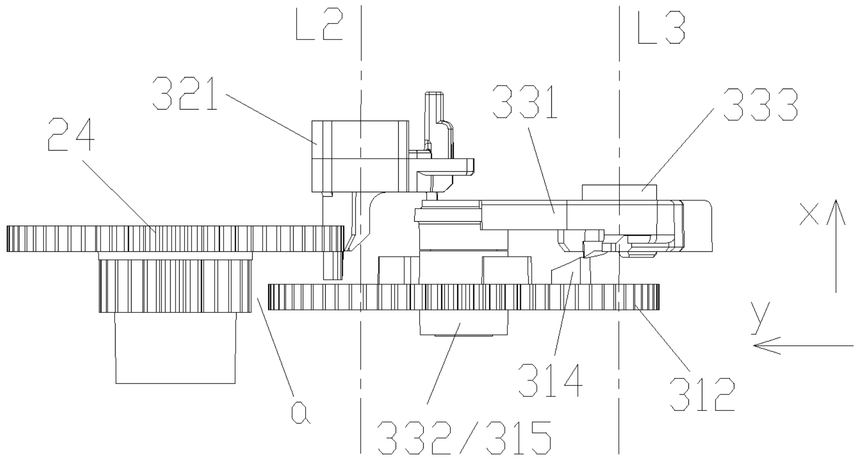
FIG. 17B is a schematic diagram of the relative positions of the counting gear, the driving member, and the moving member of the counting device in the developing cartridge viewed along the vertical direction of the developing cartridge when the counting device finishes the counting process according to Embodiment 2 of the present disclosure.

FIG. 17A is a schematic diagram of the relative positions of the counting gear, the driving member, and the moving member of the counting device in the developing cartridge when the counting device finishes the counting process according to Embodiment 2 of the present disclosure; and FIG. 17B is a schematic diagram of the relative positions of the counting gear, the driving member, and the moving member of the counting device in the developing cartridge viewed along the vertical direction of the developing cartridge when the counting device finishes the counting process according to Embodiment 2 of the present disclosure.

When the counting device 30 is about to complete the counting process, the front end 314*a* of the unlocking member reaches a position adjacent to the unlocking protrusion 1261. The unlocking protrusion 1261 is provided with an inclined surface corresponding to the inclined surface 314*c*. The inclined surface 314*c* is gradually abutted against the inclined surface of the unlocking protrusion 1261. As the counting gear 31 continues to rotate, the unlocking member 314 deforms the locking member 126 by pushing the unlocking protrusion 1261. Specifically, the locking member 126 deforms in a direction away from the housing 10. The locked part 336 is separated from the locking groove 1263. The first reset member 34 releases the pushing force. The moving member 33 begins to rotate around the rotation axis L3 in the r4-direction. Meanwhile, under the action of the combination part 315 and the combined part 332, the counting gear 31 is driven by the moving member 33 to rotate around the rotation axis L3 in the r4-direction. As shown in FIG. 17B, the counting gear 31 is separated from the driving member 24, and the gap a is formed between the counting gear 31 and the driving member 24. The driving force of the driving member 24 cannot be transmitted to the counting gear 31. At this point, the counting gear 31 remains stationary. The pushed part 337 moves to the outside of the first through-hole 12*a*, or is exposed through the first through-hole 12*a*.

When the counting device 30 needs to be reset, as described above, through the first through-hole 12*a*, the pushed part 337 is pushed by the operator or the drum frame or a part of the laser printer to overcome the pushing force of the first reset member 34 on the moving member 33, causing the moving member 33 to rotate around the rotation axis L3 in a direction opposite to the r4-direction. Meanwhile, through the action of the combination part 315 and the combined part 332, the counting gear 31 is driven by the moving member 33 to rotate around the rotation axis L3 in a direction opposite to the r4-direction. As shown in FIG. 16C, the counting gear 31 returns to the position where the counting gear 31 is combined with the driving member 24.

In the present disclosure, when the counting device 30 needs to be reset, it is not necessary to open the end cover 12. It is only necessary to apply a force to the pushed part 337 of the moving member 33 by the operator or the drum frame or a part of the laser printer. Thus, the pushing force of the first reset member 34 is overcome, and the moving member 33 drives the counting gear 31 to rotate towards the driving member 24. This operation is faster.

What is claimed is:

1. A developing cartridge, comprising:

a housing for accommodating toner, a developing roller rotatably mounted in the housing, a doctor blade element in contact with the developing roller, and a driving device located at a longitudinal end of the housing;

wherein the driving device comprises a driving force input member and a developing roller gear, wherein the developing roller gear is located at an end of the developing roller; the driving force input member comprises a driving force receiving part and a first driving gear combined with the driving force receiving part, wherein a diameter of the first driving gear is larger than a diameter of the driving force receiving part, and the first driving gear is meshed with the developing roller gear; the doctor blade element is in contact with an outer surface of the developing roller to adjust a thickness of a toner layer on the outer surface of the developing roller; the doctor blade element comprises a blade holder and a blade, wherein the blade holder and the blade are combined; the blade holder is fixedly mounted on the housing, and the blade holder comprises a first part and a second part, wherein blade holder is bent between the first part and the second part such that a bent part of the blade holder is formed between the first part and the second part, and the blade is fixed on the second part; the blade is abutted against the outer surface of the developing roller; and when viewed along a longitudinal direction of the developing cartridge, the driving force receiving part does not overlap with the blade and the bent part, and the first driving gear overlaps with the first part of the blade holder.

2. The developing cartridge according to claim 1, further comprising:

a supply roller rotatably mounted in the housing, and a supply roller gear located at an end of the supply roller;

wherein the supply roller is configured to convey the toner to the developing roller;

the driving device further comprises a second driving gear combined with the driving force receiving part and meshed with the supply roller gear;

the first part is fixedly mounted on the housing; and when viewed along the longitudinal direction of the developing cartridge, the second driving gear does not overlap with at least one of the bent part, the second part of the blade holder, and the blade.

3. The developing cartridge according to claim 1, wherein the developing roller has a diameter of 12 mm-19 mm.

4. The developing cartridge according to claim 3, wherein the developing roller has a diameter of 16 mm.

5. The developing cartridge according to claim 1, wherein when viewed along a rotation axis of the driving force receiving part, a distance between a center point of the developing roller and a center point of the driving force receiving part is 17 mm-19 mm.

6. The developing cartridge according to claim 1, wherein the developing roller and a contact position between the doctor blade element and the developing roller are located adjacent to the driving force receiving part.

7. The developing cartridge according to claim 1, wherein, when viewed along a longitudinal direction of the developing cartridge, the driving force receiving part does not overlap with the developing roller.

8. The developing cartridge according to claim 1, wherein the blade is in contact with the developing roller; and the first part is fixedly mounted on the housing.

9. The developing cartridge according to claim 1, further comprising a counting device located at the longitudinal end of the housing, wherein the counting device comprises a driven member and a pushing member; the driven member is driven by the driving force receiving part, such that the pushing member interacts with a counted part located outside the developing cartridge; and the pushing member is eccentric relative to the driven member.

10. The developing cartridge according to claim 1, further comprising a counting device located at the longitudinal end of the housing, wherein the counting device comprises a driven member and a pushing member; the driven member is driven by the driving force receiving part, such that the pushing member interacts with a counted part located outside the developing cartridge; and the pushing member is eccentric relative to the driven member.

11. The developing cartridge according to claim 10, further comprising a support frame for supporting the driving force receiving part, wherein the support frame is provided with a pushed part for receiving a pushing force; and the developing roller maintains contact with an external photosensitive drum by the pushing force.

12. The developing cartridge according to claim 10, further comprising a driving member for receiving the driving force from the driving force receiving part, wherein the counting device further comprises a moving member; and the driven member is movable between a position where the driven member is combined with the driving member and a position where the driven member is separated from the driving member under a drive of the moving member.

13. The developing cartridge according to claim 12, further comprising an end cover covering a part of the counting device, wherein the pushing member and the moving member are exposed from different positions of the end cover.

14. The developing cartridge according to claim 12, further comprising an end cover covering a part of the counting device, wherein the driven member is provided with an unlocking member; the end cover is provided with a locked member; when the counting device counts, the moving member is locked by a locking member; when the counting device finishes counting, the unlocking member unlocks the locked member, and the moving member allows the driven member to separate from the driving member.

15. The developing cartridge according to claim 12, wherein the driven member is provided with a combined part; the moving member is provided with a combination part; and the combination part is coaxial with the combined part.

16. The developing cartridge according to claim 15, wherein the moving member moves in a plane perpendicular to a rotation axis of the driven member.

17. The developing cartridge according to claim 16, wherein the moving member rotates around a rotation axis different from the rotation axis of the driven member, such that the driven member is separated from the driving member.

18. The developing cartridge according to claim 17, wherein the counting device further comprises a first reset member abutted against the moving member; and under a pushing force of the first reset member, the moving member tends to move away from the driving member.

19. The developing cartridge according to claim 18, wherein the counting device further comprises a second reset member combined with the pushing member; and the second reset member is configured to force the pushing member back to a position where the pushing member is allowed to receive a pushing force applied by the driven member.

* * * * *